(12) United States Patent
Ookubo et al.

(10) Patent No.: US 10,696,934 B2
(45) Date of Patent: Jun. 30, 2020

(54) WATER-SOLUBLE FILM, CHEMICAL AGENT PACKAGE AND WATER-SOLUBLE FILM PRODUCTION METHOD

(71) Applicant: THE NIPPON SYNTHETIC CHEMICAL INDUSTRY CO., LTD., Osaka (JP)

(72) Inventors: Masanori Ookubo, Osaka (JP); Katsuhiko Katsuma, Osaka (JP); Takahiro Hiura, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 111 days.

(21) Appl. No.: 15/753,693

(22) PCT Filed: Sep. 7, 2016

(86) PCT No.: PCT/JP2016/076258
§ 371 (c)(1),
(2) Date: Feb. 20, 2018

(87) PCT Pub. No.: WO2017/043509
PCT Pub. Date: Mar. 16, 2017

(65) Prior Publication Data
US 2018/0245028 A1    Aug. 30, 2018

(30) Foreign Application Priority Data

Sep. 11, 2015  (JP) .................................. 2015-179020
Nov. 12, 2015  (JP) .................................. 2015-221980

(51) Int. Cl.
*C11D 17/04* (2006.01)
*C11D 3/37* (2006.01)
(Continued)

(52) U.S. Cl.
CPC .......... *C11D 17/042* (2013.01); *B29C 41/003* (2013.01); *B29C 41/24* (2013.01);
(Continued)

(58) Field of Classification Search
None
See application file for complete search history.

(56) References Cited

U.S. PATENT DOCUMENTS 6,451,750 B2 *  9/2002  Hewitt ............... C11D 17/0004
                                                  510/296
2001/0039319 A1 * 11/2001  Harita ........................ C08J 5/18
                                                  526/319
(Continued)

FOREIGN PATENT DOCUMENTS

CN    101535385    9/2009
CN    107001754    8/2017
(Continued)

OTHER PUBLICATIONS

International Search Report issued with respect to Application No. PCT/JP2016/076258, dated Dec. 6, 2016.
(Continued)

*Primary Examiner* — Lorna M Douyon
(74) *Attorney, Agent, or Firm* — Greenblum & Bernstein, P.L.C.

(57) ABSTRACT

A water-soluble film contains a polyvinyl alcohol resin (A), and has a complete dissolution time (T) and a curl area percentage (S), wherein a product (T×S) of the complete dissolution time (T) and the curl area percentage (S) satisfies the following expression (1):

$$1000 \leq (\text{Complete dissolution time } (T)) \times (\text{Curl area percentage } (S)) \leq 7000 \qquad (1)$$

(Continued)

The water-soluble film satisfies contradictory property requirements, i.e., satisfactory solubility and curl suppressing property, for example, even if being formed by using an acid-modified PVA resin.

10 Claims, 1 Drawing Sheet (51) Int. Cl.
    *B65D 65/46*     (2006.01)
    *C08J 5/18*     (2006.01)
    *B29C 41/24*     (2006.01)
    *B29C 41/46*     (2006.01)
    *C08L 29/04*     (2006.01)
    *B29C 41/00*     (2006.01)
    *C08K 5/053*     (2006.01)
    *C08K 5/00*     (2006.01)
    *B29K 29/00*     (2006.01)
    *B29L 31/00*     (2006.01)

(52) U.S. Cl.
    CPC .............. *B29C 41/46* (2013.01); *B65D 65/46* (2013.01); *C08J 5/18* (2013.01); *C08L 29/04* (2013.01); *C11D 3/3753* (2013.01); *C11D 17/043* (2013.01); *B29K 2029/04* (2013.01); *B29K 2867/003* (2013.01); *B29K 2995/0062* (2013.01); *B29L 2031/7128* (2013.01); *C08J 2329/04* (2013.01); *C08J 2403/02* (2013.01); *C08J 2429/04* (2013.01); *C08K 5/0016* (2013.01); *C08K 5/053* (2013.01)

(56) References Cited

U.S. PATENT DOCUMENTS

| | | | |
|---|---|---|---|
| 2001/0053754 A1* | 12/2001 | Hewitt | C11D 17/0004 510/293 |
| 2002/0013243 A1* | 1/2002 | Hewitt | C11D 17/0004 510/293 |
| 2002/0182348 A1* | 12/2002 | Fujiwara | B29D 7/01 428/35.2 |
| 2004/0092635 A1 | 5/2004 | Kitamura et al. | |
| 2006/0063691 A1* | 3/2006 | Carlomagno | C11D 3/2082 510/295 |
| 2007/0259996 A1 | 11/2007 | Vicari et al. | |
| 2007/0298234 A1* | 12/2007 | Oono | B29C 41/26 428/220 |
| 2008/0113173 A1* | 5/2008 | Hayakawa | C08J 5/18 428/220 |
| 2009/0291282 A1 | 11/2009 | Kitamura et al. | |
| 2010/0105821 A1 | 4/2010 | Verrall et al. | |
| 2011/0186467 A1* | 8/2011 | Denome | B65D 65/46 206/524.7 |
| 2016/0102278 A1* | 4/2016 | Labeque | C11D 17/042 510/296 |
| 2016/0326285 A1 | 11/2016 | Mori et al. | |
| 2017/0233539 A1 | 8/2017 | Friedrich et al. | |

FOREIGN PATENT DOCUMENTS

| | | |
|---|---|---|
| EP | 3348604 A1 | 7/2018 |
| EP | 3348606 A1 | 7/2018 |
| EP | 3348607 A1 | 7/2018 |
| EP | 3348608 A1 | 7/2018 |
| JP | 2001-329130 A | 11/2001 |
| JP | 2002-301899 A | 10/2002 |
| JP | 2004-161823 A | 6/2004 |
| JP | 2009-51947 A | 3/2009 |
| JP | 2013-518173 A | 5/2013 |
| WO | 02/16205 A1 | 2/2002 |
| WO | 2015/098979 A1 | 7/2015 |

OTHER PUBLICATIONS

International Preliminary Report on Patentability issued with respect to Application No. PCT/JP2016/076258, dated Mar. 13, 2018.
European Search Report, European Patent Office, Patent Application No. 16844370.3, dated Apr. 30, 2019.
Analysis of Mean Disintegration Time and Mean Dissolution Time by Moment Analysis Using Microcalorimetric Curves, Shigeo Yamamura et al, issued 2000, p. 1-6.
Chinese Office Action, Chinese Patent Office, Application No. 20001680046684.6, dated Mar. 18, 2020, with English translation thereof.

* cited by examiner

WATER-SOLUBLE FILM, CHEMICAL AGENT PACKAGE AND WATER-SOLUBLE FILM PRODUCTION METHOD

TECHNICAL FIELD

The present disclosure relates to a water-soluble film containing a polyvinyl alcohol resin (the polyvinyl alcohol being hereinafter abbreviated to "PVA" and the water-soluble film being hereinafter sometimes referred to as "PVA film"). More specifically, the present disclosure relates to a water-soluble film which is highly soluble and is less susceptible to curling to thereby ensure excellent sealability without displacement of seal portions thereof and higher productivity when a package is produced from the water-soluble film. The present disclosure further relates to a chemical agent package produced by using the water-soluble film, and a water-soluble film production method.

BACKGROUND ART

PVA films are made of PVA resins which are thermoplastic and yet water-soluble. The PVA films are significantly different in various film properties and texture than hydrophobic films such as polyethylene terephthalate films and polyolefin films which are generally used as packaging films.

Conventionally, chemical agent portion packages (unit packages) have been proposed which each include a bag formed from a PVA resin film and a chemical agent such as an agricultural chemical or a detergent contained in the bag, and take advantage of the water solubility of the PVA resin. The unit packages are used in a wide variety of applications.

Known examples of the PVA resin film to be used for the water-soluble unit packages in such applications include: a water-soluble film (see, for example, PTL 1) which comprises 100 parts by weight of a PVA, 5 to 30 parts by weight of a plasticizer, 1 to 10 parts by weight of starch and 0.01 to 2 parts by weight of a surfactant; and a water-soluble film (see, for example, PTL 2) which is formed from a resin composition containing 100 parts by weight of an anionic group-modified PVA resin (A) having a 4 wt. % aqueous solution viscosity of 10 to 35 mPa·s as measured at 20° C., an average saponification degree of 80.0 to 99.9 mol % and an anionic group modification degree of 1 to 10 mol %, 20 to 50 parts by weight of a plasticizer (B), 2 to 30 parts by weight of a filler (C) and 0.01 to 2.5 parts by weight of a surfactant (D).

RELATED ART DOCUMENT

Patent Document

PTL 1: JP-A-2001-329130
PTL 2: JP-A-2004-161823

SUMMARY OF INVENTION

The water-soluble films disclosed in PTL 1 and PTL 2 are highly water-soluble, and can be used for chemical agent packages in which a liquid detergent or the like is packaged. The water-soluble films for the packaging desirably contain an acid-modified PVA so as to be imparted with higher resistance to the liquid detergent and other detergents.

On the other hand, the water-soluble films are liable to be curled in film formation and, therefore, require a heat treatment at a higher temperature for prevention of curling.

Where a water-soluble film containing the acid-modified PVA resin is heat-treated, however, the physical properties (e.g., solubility) of the water-soluble film are considered to be deteriorated as compared with an ordinary water-soluble film made of an unmodified PVA, because the acid-modified PVA resin is more liable to be crystallized than the unmodified PVA. Therefore, it is difficult to simultaneously satisfy these contradictory property requirements, i.e., a curl-suppressing property and solubility.

In view of the foregoing, the present disclosure provides a water-soluble film which is formed by using an acid-modified PVA resin and yet satisfies the contradictory property requirements (solubility and curl-suppressing property), and ensures excellent sealability without displacement of seal portions thereof and higher productivity when a package is formed from the water-soluble film. The present disclosure further provides a chemical agent package produced by packaging a chemical agent with the water-soluble film, and a water-soluble film production method.

The inventors conducted intensive studies in view of the foregoing and, as a result, focused on contradictory physical properties, i.e., complete dissolution time and curl area percentage, of the water-soluble film containing the PVA resin, and found it important to properly control the product of the values of these physical properties within a selected range, whereby a water-soluble film can be provided which is highly soluble and is less susceptible to curling to ensure excellent sealability without displacement of seal portions thereof and higher productivity when a package is produced from the water-soluble film.

According to an inventive aspect, there is provided a water-soluble film which comprises a PVA resin (A), and has a complete dissolution time (T) and a curl area percentage (S), wherein a product (T×S) of the complete dissolution time (T) and the curl area percentage (S) satisfies the following expression (1):

$$1000 \leq (\text{Complete dissolution time } (T)) \times (\text{Curl area percentage } (S)) \leq 7000 \qquad (1)$$

wherein the complete dissolution time (T) is a time (seconds) required for dissolving a 35 mm×35 mm specimen of the water-soluble film in water as measured when the specimen is immersed in water at 10° C. after being allowed to stand at 23° C. at 40% RH for 24 hours, and the curl area percentage (S) is the percentage (%) of the area of a curled portion of a 100 mm×100 mm specimen of the water-soluble film with respect to the area of the entire specimen as measured from its front side after the specimen is suspended at 23° C. at 40% RH for 24 hours with a machine direction (MD) edge of the specimen fixed.

According to another inventive aspect, there is provided a chemical agent package produced by packaging a liquid detergent with the water-soluble film.

According to further another inventive aspect, there is provided a water-soluble film production method including the steps of: forming a film from a film-forming material containing a PVA resin (A), and drying the film; and heat-treating the film at 95° C. to 135° C.

The inventive water-soluble film is highly soluble and is less susceptible to curling to thereby ensure excellent sealability without the displacement thereof and higher productivity when a package is formed from the water-soluble film. The water-soluble film is usable in various packaging applications, and is particularly useful for unit packaging applications for unit-packaging a chemical agent or the like.

Where the complete dissolution time (T) is not longer than 150 seconds, the water-soluble film of the chemical agent package has satisfactory solubility.

Where the curl area percentage (S) is not higher than 50%, the water-soluble film is imparted with higher working efficiency.

Where the water-soluble film further comprises a plasticizer (B), the water-soluble film is imparted with proper flexibility.

Where the plasticizer (B) is present in a proportion of not less than 20 parts by weight based on 100 parts by weight of the PVA resin (A) in the water-soluble film, the toughness of the water-soluble film of the chemical agent package is less liable to be reduced over time.

Where the PVA resin (A) includes an anionic group-modified PVA resin (a1), the water-soluble film is improved in water solubility.

Where the water-soluble film has a water content of 3 to 15 wt. %, the water-soluble film has proper flexibility and is substantially free from blocking.

DESCRIPTION OF EMBODIMENTS

The present disclosure will hereinafter be described more specifically.

A water-soluble film according to the present disclosure contains a PVA resin (A), and has a complete dissolution time (T) and a curl area percentage (S), wherein the product (T×S) of the complete dissolution time (T) and the curl area percentage (S) satisfies the following expression (1):

1000≤(Complete dissolution time (T))×(Curl area percentage (S))≤7000   (1)

wherein the complete dissolution time (T) is a time (seconds) required for dissolving a 35 mm×35 mm specimen of the water-soluble film in water as measured when the specimen is immersed in water at 10° C. after being allowed to stand at 23° C. at 40% RH for 24 hours, and the curl area percentage (S) is the percentage (%) of the area of a curled portion of a 100 mm×100 mm specimen of the water-soluble film with respect to the area of the entire specimen as measured from its front side after the specimen is suspended at 23° C. at 40% RH for 24 hours with a machine direction (MD) edge of the specimen fixed.

The product (T×S) of the complete dissolution time (T) and the curl area percentage (S) preferably falls within a range represented by the following expression (2), more preferably within a range represented by the following expression (3):

1500≤(Complete dissolution time (T))×(Curl area percentage (S))≤6000   (2)

2000≤(Complete dissolution time (T))×(Curl area percentage (S))≤5000   (3)

If the product (T×S) falls outside the aforementioned range, the balance between solubility and curl-preventing property will be deteriorated.

In the present disclosure, the complete dissolution time (T) is preferably not longer than 150 seconds, more preferably 10 to 145 seconds, particularly preferably 20 to 140 seconds. If the complete dissolution time is excessively long, a liquid detergent package produced by using the water-soluble film tends to require a longer dissolution time. If the complete dissolution time is excessively short, the package is liable to be broken even with a water droplet adhering thereto for a short period of time.

In the present disclosure, the curl area percentage (S) is preferably not higher than 50%, more preferably not higher than 47%, particularly preferably not higher than 45%. If the curl area percentage is excessively high, the water-soluble film is liable to curl to thereby reduce the working efficiency in production of a pouch.

In the present disclosure, the complete dissolution time (T) and the curl area percentage (S) are measured in the following manner.

[Complete Dissolution Time (T)]

A 35 mm×35 mm water-soluble film specimen is cut out from a middle portion of the water-soluble film with respect to a transverse direction (TD) of the water-soluble film. The water-soluble film specimen is allowed to stand at 23° C. at 40% RH for 24 hours, and then fastened to a jig so as to be kept parallel to a water surface. On the other hand, 1 liter of water at 10° C. is put in a 1-liter beaker, and stirred so that a vortex is formed to reach a height of 50 mm from the water surface by controlling the rotation of a stirrer. The water-soluble film specimen preliminarily fastened to the jig is placed at a depth of 50 mm below the water surface, and then a time (seconds) required for dissolving the water-soluble film specimen is measured.

[Curl Area Percentage (S)]

Figure 1:
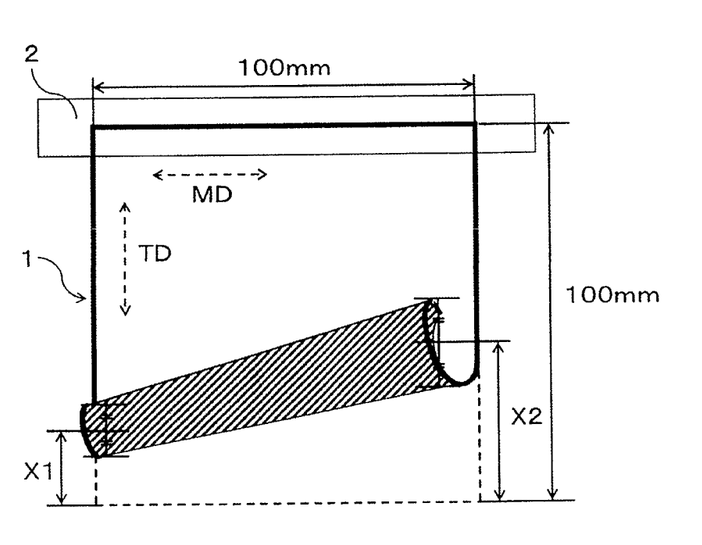
FIG. 1 is a schematic diagram showing how to measure and calculate the curl area percentage of a water-soluble film.

A 100 mm×100 mm water-soluble film specimen is cut out from a middle portion of the water-soluble film with respect to the transverse direction (TD). Then, as shown in FIG. 1, a machine direction (MD) edge of the water-soluble film specimen 1 is fixed by a 15-mm wide adhesive tape 2, and the water-soluble film specimen 1 is kept suspended at 23° C. at 40% RH for 24 hours. At this time, the area of a curled portion of the water-soluble film specimen 1 is calculated. Based on the value of the area thus calculated, the curl area percentage (S) of the water-soluble film specimen 1 is calculated from the following expression:

Curl area percentage (%)=100×[{(X1)+(X2)}/2]×100/10000

X1: The length (mm) of a first curl edge as measured from the lowermost end of the uncurled specimen to a center of the first curl edge.

X2: The length (mm) of a second curl edge as measured from the lowermost end of the uncurled specimen to a center of the second curl edge.

The inventive water-soluble film is produced, for example, in the following manner.

First, the PVA resin (A) to be used in the present disclosure will be described.

Examples of the PVA resin (A) to be used in the present disclosure include an unmodified PVA and a modified PVA resin.

The PVA resin (A) to be used in the present disclosure preferably has an average saponification degree of not less than 80 mol %, particularly preferably 82 to 99.9 mol %, more preferably 85 to 98.5 mol %, especially preferably 90 to 97 mol %. If the saponification degree is excessively low, the solubility of the water-soluble film tends to be reduced over time depending on the pH of a chemical agent to be packaged with the water-soluble film. If the average saponification degree is excessively high, the water solubility of the water-soluble film tends to be significantly reduced due to thermal history experienced during film formation. Where the unmodified PVA is used as the PVA resin (A) in the present disclosure, the unmodified PVA preferably has an average saponification degree of not less than 80 mol %, particularly preferably 82 to 99 mol %, more preferably 85 to 90 mol %. Where the modified PVA resin is used as the PVA resin (A), on the other hand, the modified PVA resin preferably has an average saponification degree of not less than 80 mol %, particularly preferably 85 to 99.9 mol %, more preferably 90 to 98 mol %. Further, where an anionic group-modified PVA resin is used as the PVA resin (A), the anionic group-modified PVA resin preferably has an average saponification degree of not less than 85 mol %, particularly preferably 88 to 99 mol %, more preferably 90 to 97 mol %.

The polymerization degree of the PVA resin (A) is generally expressed by an aqueous solution viscosity. The PVA resin (A) preferably has a 4 wt. % aqueous solution viscosity of 5 to 50 mPa·s, more preferably 10 to 45 mPa·s, particularly preferably 15 to 40 mPa·s, as measured at 20° C. If the viscosity is excessively low, the mechanical strength of the water-soluble film as a packaging material tends to be reduced. If the viscosity is excessively high, on the other hand, the productivity of the film tends to be reduced because of a higher aqueous solution viscosity during the film formation. The unmodified PVA preferably has a 4 wt. % aqueous solution viscosity of 5 to 50 mPa·s, more preferably 10 to 45 mPa·s, particularly preferably 15 to 40 mPa·s, as measured at 20° C. On the other hand, the modified PVA resin preferably has a 4 wt. % aqueous solution viscosity of 5 to 50 mPa·s, more preferably 10 to 45 mPa·s, particularly preferably 15 to 40 mPa·s, as measured at 20° C.

The average saponification degree described above is measured in conformity with JIS K6726 3.5, and the 4 wt. % aqueous solution viscosity is measured in conformity with JIS K6726 3.11.2.

Examples of the modified PVA resin include a nonionic group-modified PVA resin, a cationic group-modified PVA resin and an anionic group-modified PVA resin. In the present disclosure, the anionic group-modified PVA resin is particularly preferably used from the viewpoint of solubility of the water-soluble film. Examples of the anionic group include a carboxyl group, a sulfonic acid group and a phosphoric acid group. For chemical resistance and long-term stability, the carboxyl group and the sulfonic acid group are preferred, and the carboxyl group is particularly preferred.

In the present disclosure, the modification degree of the anionic group-modified PVA resin is preferably 1 to 10 mol %, more preferably 2 to 9 mol %, particularly preferably 2 to 8 mol %, especially preferably 3 to 7 mol %. If the modification degree is excessively low, the water solubility tends to be reduced. If the modification degree is excessively high, the modified PVA resin tends to have lower productivity and lower biodegradability, and is liable to cause blocking and, therefore, is less practical.

In the present disclosure, the unmodified PVA and the modified PVA resin may be each used alone as the PVA resin (A), or may be used in combination as the PVA resin (A). Further, two or more types of PVA resins having different saponification degrees, different viscosities, different modifying groups and different modification degrees may be used in combination. In the present disclosure, the PVA resin (A) preferably includes the modified PVA resin. Particularly, the PVA resin (A) preferably includes the anionic group-modified PVA resin, or the anionic-group modified PVA resin and the unmodified PVA. More specifically, the PVA resin (A) is preferably the modified PVA resin for the long-term solubility of the water-soluble film. The PVA resin (A) preferably includes the anionic group-modified PVA resin and the unmodified PVA for the strength of the water-soluble film.

The weight ratio between the modified PVA resin and the unmodified PVA is preferably 95/5 to 60/40, particularly preferably 94/6 to 70/30, more preferably 93/7 to 80/20. If the weight ratio is excessively low, the bleeding of a plasticizer is liable to occur. If the weight ratio is excessively high, the blocking is liable to occur.

Where the modified PVA resin and the unmodified PVA are used in combination, the unmodified PVA preferably has a 4 wt. % aqueous solution viscosity of 5 to 50 mPa·s, more preferably 8 to 45 mPa·s, particularly preferably 12 to 40 mPa·s, especially preferably 15 to 35 mPa·s, as measured at 20° C. If the viscosity is excessively low, the mechanical strength of the water-soluble film as the packaging material tends to be reduced. If the viscosity is excessively high, on the other hand, the productivity of the film tends to be reduced because of a higher aqueous solution viscosity during the film formation.

The unmodified PVA may be prepared by saponifying a vinyl ester polymer prepared by polymerization of a vinyl ester compound.

Examples of the vinyl ester compound include vinyl formate, vinyl acetate, vinyl trifluoroacetate, vinyl propionate, vinyl butyrate, vinyl caprate, vinyl laurate, vinyl versatate, vinyl palmitate and vinyl stearate. Particularly, vinyl acetate is preferably used as the vinyl ester compound. The aforementioned vinyl ester compounds may be used alone or in combination.

The modified PVA resin may be prepared, for example, by copolymerizing the vinyl ester compound and an unsaturated monomer copolymerizable with the vinyl ester compound and then saponifying the resulting copolymer, or by post-modifying the unmodified PVA.

In the present disclosure, the copolymerizable unsaturated monomer may be copolymerized with the vinyl ester compound. For the preparation of the modified PVA resin, the unsaturated monomer to be copolymerized should contain a modifying group. Examples of the unsaturated monomer include olefins such as ethylene, propylene, isobutylene, $\alpha$-octene, $\alpha$-dodecene and $\alpha$-octadecene; hydroxyl-containing $\alpha$-olefins such as 3-butene-1-ol, 4-pentene-1-ol and 5-hexene-1-ol, and acylation products and other derivatives of these hydroxyl-containing $\alpha$-olefins; unsaturated acids such as acrylic acid, methacrylic acid, crotonic acid, maleic acid, maleic anhydride, itaconic acid and undecylenic acid, and salts, monoesters and dialkyl esters of these unsaturated acids; amides such as diacetone acrylamide, acrylamide and methacrylamide; and olefin sulfonic acids such as ethylene sulfonic acid, allyl sulfonic acid and methallyl sulfonic acid, and salts of these olefin sulfonic acids, which may be used alone or in combination. The proportion of the copolymerizable monomer is typically not greater than 10 mol %.

The modified PVA resin has a primary hydroxyl group at its side chain, and the number of primary hydroxyl groups is typically 1 to 5, preferably 1 to 2, particularly preferably 1. Particularly, the modified PVA resin preferably has a secondary hydroxyl group in addition to the primary hydroxyl group. Examples of the modified PVA resin include a PVA resin having a 1,2-diol structural unit at its side chain, and a PVA resin having a hydroxyalkyl group at its side chain. The PVA resin having the 1,2-diol structural unit at its side chain may be prepared, for example, by: (i) saponifying a copolymer of vinyl acetate and 3,4-diacetoxy-1-butene; (ii) saponifying and decarbonating a copolymer of vinyl acetate and vinyl ethylene carbonate; (iii) saponifying and deketalizing a copolymer of vinyl acetate and 2,2-dialkyl-4-vinyl-1,3-dioxolane; or (iv) saponifying a copolymer of vinyl acetate and glycerin monoallyl ether.

Exemplary copolymerization methods to be used for the preparation of the PVA resin (A) include a solution polymerization method, an emulsion polymerization method, a suspension polymerization method and other conventionally known polymerization methods. A solution polymerization method using a lower alcohol such as methanol, ethanol or isopropyl alcohol as a solvent is typically employed. Where the modified PVA resin is prepared by the solution polymerization method, the polymerization is started, for example, with the whole amount of the vinyl ester compound and a part of the hydroxyl-containing unsaturated monomer fed as the monomers, and allowed to proceed by continuously or dividedly adding the rest of the unsaturated monomer during the polymerization. Alternatively, the whole amounts of the vinyl ester compound and the carboxyl-containing unsaturated monomer are simultaneously fed as the monomers for the polymerization.

A polymerization catalyst may be properly selected from azo catalysts such as azobisisobutyronitrile, peroxide catalysts such as acetyl peroxide, benzoyl peroxide and lauroyl peroxide, and other conventionally known polymerization catalysts according to the polymerization method. The polymerization reaction temperature may be selected from a range between about 50° C. and the boiling point of the polymerization catalyst.

The resulting copolymer is dissolved in an alcohol, and saponified in the presence of a saponification catalyst. Examples of the alcohol include C1 to C5 alcohols such as methanol, ethanol and butanol. The concentration of the copolymer in the alcohol may be selected from a range between 20 and 50 wt. %.

Usable examples of the saponification catalyst include alkali catalysts including hydroxides and alcoholates of alkali metals such as sodium hydroxide, potassium hydroxide, sodium methylate, sodium ethylate and potassium methylate, and acid catalysts. The saponification catalyst is used in an amount of 1 to 100 mmol equivalent relative to the vinyl ester compound. These saponification catalysts may be used alone or in combination.

A carboxyl group-modified PVA resin as the modified PVA resin, for example, may be prepared by any method. Examples of the method include: (I) a method in which a carboxyl-containing unsaturated monomer and a vinyl ester compound are copolymerized and then the resulting copolymer is saponified; and (II) a method in which a vinyl ester compound is polymerized in the presence of a carboxyl-containing alcohol, aldehyde or thiol as a chain transfer agent and the resulting polymer is saponified.

Examples of the vinyl ester compound to be used in the method (I) or (II) include those described above, and vinyl acetate is preferably used.

Examples of the carboxyl-containing unsaturated monomer to be used in the method (I) include ethylenically unsaturated dicarboxylic acids (maleic acid, fumaric acid, itaconic acid and the like), ethylenically unsaturated dicarboxylic acid monoesters (monoalkyl maleates, monoalkyl fumarates, monoalkyl itaconates and the like), ethylenically unsaturated dicarboxylic acid diesters (dialkyl maleates, dialkyl fumarates, dialkyl itaconates and the like) which need conversion to carboxyl groups by hydrolysis in the saponification, ethylenically unsaturated carboxylic anhydrides (maleic anhydride, itaconic anhydride and the like), ethylenically unsaturated monocarboxylic acids ((meth) acrylic acid, crotonic acid and the like), and salts of these compounds. Particularly, maleic acid, a monoalkyl maleate, a dialkyl maleate, a maleic acid salt, maleic anhydride, itaconic acid, a monoalkyl itaconate, a dialkyl itaconate, (meth)acrylic acid or the like is preferably used. More preferably, maleic acid, the monoalkyl maleate, the dialkyl maleate, the maleic acid salt or maleic anhydride is used. Particularly preferably, the monoalkyl maleate is used. These carboxyl-containing unsaturated monomers may be used alone or in combination.

In the method (II), a compound derived from the thiol having a greater chain transfer effect is effective, and examples of the effective compound include compounds represented by the following general formulae (1) to (3):

wherein n is an integer of 0 to 5.

wherein n is an integer of 0 to 5, and $R_1$, $R_2$ and $R_3$ are each a hydrogen atom or a lower alkyl group (which may have a substituent).

wherein n is an integer of 0 to 20.

The thiol-derived compound may be a salt of any of the compounds represented by the above general formulae (1) to (3). Specific examples of the salt include mercaptoacetic acid salts, 2-mercaptopropionic acid salts, 3-mercaptopropionic acid salts and 2-mercaptostearic acid salts.

These compounds may be used alone or in combination.

The carboxyl-containing unsaturated monomer and the vinyl ester compound may be copolymerized with other general monomer as long as the water solubility is not impaired. Examples of the general monomer include alkyl esters of ethylenically unsaturated carboxylic acids, allyl esters of saturated carboxylic acids, α-olefins, alkyl vinyl ethers, alkyl allyl ethers, (meth)acrylamide, (meth)acrylonitrile, styrene and vinyl chloride, which may be used alone or in combination.

The preparation method for the carboxyl group-modified PVA resin is not limited to the aforementioned methods. For example, the PVA resin (partially saponified PVA resin or completely saponified PVA resin) may be allowed to post-react with a carboxyl-containing compound, such as a dicarboxylic acid, an aldehyde carboxylic acid or a hydroxycarboxylic acid, having a functional group reactive with a hydroxyl group.

Where a sulfonic acid-modified PVA resin modified with a sulfonic acid group is used, the sulfonic acid-modified PVA resin may be prepared by copolymerizing the vinyl ester compound with a comonomer such as vinylsulfonic acid, styrenesulfonic acid, allylsulfonic acid, methallylsulfonic acid or 2-acrylamido-2-methylpropanesulfonic acid and saponifying the resulting copolymer, or by introducing vinylsulfonic acid or its salt, or 2-acrylamido-2-methylpropanesulfonic acid or its salt into the PVA resin by Michael addition reaction.

On the other hand, exemplary methods for the post-modification of the unmodified PVA are acetoacetic acid esterification, acetalization, urethanation, etherification, grafting, phosphoric acid esterification and oxyalkylenation of the unmodified PVA.

In the present disclosure, where a chemical agent package is produced by using the water-soluble film, a plasticizer (B) is preferably added to the PVA resin (A) to impart the water-soluble film with flexibility. Only one type of plasticizer or at least two types of plasticizers may be used as the plasticizer (B). Where the package is produced by using the water-soluble film, at least two types of plasticizers are preferably used in combination as the plasticizer (B) in order to impart the water-soluble film with toughness, low-temperature sealability and higher sealing strength.

The plasticizer (B) preferably includes a polyalcohol (b1) having a melting point of not lower than 80° C. (hereinafter sometimes referred to simply as plasticizer (b1)), and a polyalcohol (b2) having a melting point of not higher than 50° C. (hereinafter sometimes referred to simply as plasticizer (b2)) in order to ensure the toughness of the water-soluble film in the production of the water-soluble film and the production of the package, and the long-term shape stability and the low-temperature sealability of the liquid detergent package.

Most sugar alcohols, monosaccharides and polysaccharides are usable as the polyalcohol (b1) having a melting point of not lower than 80° C. Examples of the polyalcohol (b1) include: divalent alcohols such as salicyl alcohol (83° C.), catechol (105° C.), resorcinol (110° C.), hydroquinone (172° C.), bisphenol-A (158° C.), bisphenol-F (162° C.) and neopentyl glycol (127° C.); trivalent alcohols such as phloroglucinol (218° C.); tetravalent alcohols such as erythritol (121° C.), threitol (88° C.) and pentaerythritol (260° C.); pentavalent alcohols such as xylitol (92° C.), arabitol (103° C.), fucitol (153° C.) glucose (146° C.) and fructose (104° C.); hexavalent alcohols such as mannitol (166° C.), sorbitol (95° C.) and inositol (225° C.); octavalent alcohols such as lactitol (146° C.) sucrose (186° C.) and trehalose (97° C.); and nonavalent and higher-valent alcohols such as maltitol (145° C.), which may be used alone or in combination. Parenthesized numerals indicate the melting points of the respective compounds.

Among the aforementioned polyalcohols, polyalcohols having a melting point of not lower than 85° C. are preferred, and polyalcohols having a melting point of not lower than 90° C. are particularly preferred for the tensile strength of the water-soluble film. The upper limit of the melting point is preferably 300° C., particularly preferably 200° C.

In the present disclosure, the plasticizer (b1) preferably has 4 or more hydroxyl groups, more preferably 5 to 10 hydroxyl groups, particularly preferably 6 to 8 hydroxyl groups, in its molecule for compatibility with the PVA resin (A). Specifically, for example, sorbitol, sucrose, trehalose or the like is preferred.

In the present disclosure, the plasticizer (b1) preferably has a molecular weight of not less than 150, more preferably 160 to 500, particularly preferably 180 to 400, for the toughness of the water-soluble film. Specifically, for example, sorbitol, sucrose or the like is preferred.

On the other hand, an aliphatic alcohol may be used as the polyalcohol (b2) having a melting point of not higher than 50° C. Preferred examples of the aliphatic alcohol include: divalent alcohols such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol and polyethylene glycols having a molecular weight of not greater than 2,000; and trivalent or higher-valent alcohols such as glycerin (18° C.), diglycerin and triethanolamine (21° C.), which may be used alone or in combination. Parenthesized numerals indicate the melting points of the respective compounds. For the flexibility of the water-soluble film, the melting point is preferably not higher than 30° C., particularly preferably not higher than 20° C. The lower limit of the melting point is typically −80° C., preferably −10° C., particularly preferably 0° C.

In the present disclosure, the plasticizer (b2) preferably has 4 or fewer hydroxyl groups, particularly preferably 3 or fewer hydroxyl groups, in its molecule for easier control of the flexibility of the water-soluble film at around a room temperature (25° C.). Specifically, for example, glycerin or the like is preferred.

In the present disclosure, the plasticizer (b2) preferably has a molecular weight of not higher than 100, more preferably 50 to 100, particularly preferably 60 to 95, for easier control of the flexibility of the water-soluble film. Specifically, for example, glycerin or the like is preferred.

In the present disclosure, an additional plasticizer (b3) may be used in combination with the aforementioned plasticizers (b1) and (b2). Examples of the plasticizer (b3) include: alcohols such as trimethylolpropane (58° C.), diethylene glycol monomethyl ether, cyclohexanol, carbitol and polypropylene glycol; ethers such as dibutyl ether; carboxylic acids such as stearic acid, oleic acid, linoleic acid, linolenic acid, sorbic acid, citric acid and adipic acid; ketones such as cyclohexanone; amines such as monoethanolamine, triethanolamine, ethylenediamine and imidazole compounds; and amino acids such as alanine, glycine, aspartic acid, glutamic acid, histidine, lysine and cysteine, which may be used alone or in combination.

In the present disclosure, the proportion of the plasticizer (B) is preferably not less than 20 parts by weight, particularly preferably 25 to 70 parts by weight, more preferably 30 to 60 parts by weight, especially preferably 35 to 50 parts by weight, based on 100 parts by weight of the PVA resin (A). If the proportion of the plasticizer (B) is excessively small, the water-soluble film tends to lose its toughness over time when liquid such as a liquid detergent is packaged in a package formed from the water-soluble film. If the proportion of the plasticizer (B) is excessively great, the water-soluble film tends to have a lower mechanical strength.

The weight ratio (b1/b2) between the plasticizer (b1) and the plasticizer (b2) is preferably 0.1 to 5, particularly preferably 0.2 to 4.5, more preferably 0.5 to 4, especially preferably 0.7 to 3. If the weight ratio is excessively low, the water-soluble film tends to be excessively soft, thereby suffering from the blocking. If the weight ratio is excessively high, the water-soluble film tends to be excessively hard to be thereby brittle in a lower humidity environment.

The proportion of the plasticizer (b1) is preferably 5 to 40 parts by weight, more preferably 8 to 30 parts by weight, particularly preferably 10 to 25 parts by weight, based on 100 parts by weight of the PVA resin (A), and the proportion of the plasticizer (b2) is preferably 5 to 40 parts by weight, more preferably 10 to 35 parts by weight, particularly preferably 15 to 30 parts by weight, based on 100 parts by weight of the PVA resin (A).

If the proportion of the plasticizer (b1) is excessively small, the water-soluble film tends to be excessively soft, thereby suffering from the blocking. If the proportion of the plasticizer (b1) is excessively great, the water-soluble film tends to be excessively hard to be thereby brittle in the lower humidity environment. If the proportion of the plasticizer (b2) is excessively small, the water-soluble film tends to be excessively hard to be thereby brittle in the lower humidity environment. If the proportion of the plasticizer (b2) is excessively great, the water-soluble film tends to be excessively soft, thereby suffering from the blocking.

Further, the total proportion of the plasticizer (b1) and the plasticizer (b2) preferably accounts for not less than 70 wt. %, more preferably not less than 80 wt. %, particularly preferably not less than 87 wt. %, especially preferably not less than 90 wt. %, further preferably not less than 95 wt. %, of the plasticizer (B). Particularly preferably, the plasticizer (B) includes only the plasticizer (b1) and the plasticizer (b2). If the total proportion of the plasticizers (b1) and (b2) is excessively small, the water-soluble film tends to have a lower mechanical strength.

In the present disclosure, as required, the water-soluble film further contains a filler (C), a surfactant (D) and/or the like.

In the present disclosure, the filler (C) is used to impart the water-soluble film with an antiblocking property. Examples of the filler (C) include an inorganic filler and an organic filler. Particularly, the organic filler is preferred. The filler (C) preferably has an average particle diameter of 0.1 to 20 μm, more preferably 0.5 to 15 μm. The average particle diameter may be measured, for example, by means of a particle size distribution measuring apparatus of laser diffraction type or the like.

The inorganic filler preferably has an average particle diameter of 1 to 10 μm. If the average particle diameter is excessively small, the water-soluble film tends to have a lower water dispersing effect. If the average particle diameter is excessively great, the water-soluble film tends to suffer from a pinhole when being stretched in the film formation, resulting in poorer appearance.

Specific examples of the inorganic filler include talc, clay, silicon dioxide, diatom earth, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, potassium chromate and calcium citrate, which may be used alone or in combination.

The organic filler preferably has an average particle diameter of 0.5 to 20 μm, more preferably 0.5 to 10 μm, particularly preferably 0.5 to 7 μm, further preferably 0.5 to 5 μm. If the average particle diameter is excessively small, the costs tend to be increased. If the average particle diameter is excessively great, the water-soluble film tends to suffer from a pinhole when being stretched in the film formation.

Examples of the organic filler include starch, melamine resins, polymethyl (meth)acrylate resins, polystyrene resins, polylactic acids and other biodegradable resins. Particularly, biodegradable resins such as polymethyl (meth)acrylate resins, polystyrene resins and starch are preferably used. These organic fillers may be used alone or in combination.

Examples of the starch include raw starches (corn starch, potato starch, sweet potato starch, wheat starch, Kissaba starch, sago starch, tapioca starch, sorghum starch, rice starch, pea starch, kudzu starch, bracken starch, lotus starch, water chestnut starch and the like), physically modified starches (α-starch, fractionated amylose, moist heat-treated starch and the like), enzyme-modified starches (hydrolyzed dextrin, enzyme-decomposed dextrin, amylose and the like), chemically degraded starches (acid-treated starch, hypochlorous acid-oxidized starch, dialdehyde starch and the like), chemically modified starch derivatives (esterified starch, etherified starch, cationized starch, crosslinked starch and the like), which may be used alone or in combination. Among the aforementioned starches, raw starches, particularly corn starch and rice starch, are preferably used from the viewpoint of availability and economy.

The proportion of the filler (C) is preferably 1 to 30 parts by weight, more preferably 2 to 25 parts by weight, particularly preferably 2.5 to 20 parts by weight, based on 100 parts by weight of the PVA resin (A). If the proportion of the filler (C) is excessively small, the water-soluble film tends to be poorer in antiblocking property. If the proportion of the filler (C) is excessively great, the water-soluble film tends to suffer from a pinhole when being stretched in the film formation.

In the present disclosure, the surfactant (D) is used for improvement of the releasability of the water-soluble film when the film is removed from a cast surface in the film formation. A nonionic surfactant, a cationic surfactant or an anionic surfactant is typically used. Examples of the nonionic surfactant include polyoxyethylene nonyl phenyl ether, polyoxyethylene octyl nonyl ether, polyoxyethylene dodecyl phenyl ether, polyoxyethylene alkyl allyl ethers, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers such as polyoxyethylene laurylamino ether and polyoxyethylene stearylamine ether, which may be used alone or in combination. Particularly, the polyoxyalkylene alkyl ether phosphate monoethanolamine salts and polyoxyethylene laurylamino ether are preferred for stable production.

The proportion of the surfactant (D) is preferably 0.01 to 3 parts by weight, more preferably 0.1 to 2.5 parts by weight, particularly preferably 0.5 to 2 parts by weight, based on 100 parts by weight of the PVA resin (A). If the proportion of the surfactant (D) is excessively small, the water-soluble film tends to have poorer releasability when being removed from a cast surface of a film-forming apparatus in the film formation, thereby reducing the productivity. If the proportion of the surfactant (D) is excessively great, the water-soluble film tends to suffer from inconvenience, e.g., the water-soluble film is liable to have a reduced adhesive strength when being formed into a package by sealing.

In the present disclosure, the water-soluble film may contain an additional water-soluble polymer (e.g., polysodium acrylate, polyethylene oxide, polyvinyl pyrrolidone, dextrin, chitosan, chitin, methylcellulose, hydroxyethylcellulose or the like), a perfume, a rust preventing agent, a colorant, a bulking agent, a defoaming agent, a UV absorber, a fluorescent brightener, liquid paraffins and a bitter component (e.g., denatonium benzoate or the like), as long as the object of the present disclosure is not impaired. These may be used alone or in combination.

In the present disclosure, the water-soluble film preferably further contains an antioxidant for suppression of yellowing. Examples of the antioxidant include sulfites such as sodium sulfite, potassium sulfite, calcium sulfite and ammonium sulfite, tartaric acid, ascorbic acid, sodium thiosulfate, catechol and Rongalite, among which the sulfites are preferred and sodium sulfite is particularly preferred. The proportion of the antioxidant is preferably 0.1 to 10 parts by weight, more preferably 0.2 to 5 parts by weight, particularly preferably 0.3 to 3 parts by weight, based on 100 parts by weight of the PVA resin (A).

In the present disclosure, a PVA resin composition which contains the PVA resin (A) and preferably further contains the plasticizer (B) and, as required, the filler (C) and the surfactant (D) is prepared. A film-forming material is prepared by dissolving or dispersing the PVA resin composition in water, and formed into a water-soluble film (PVA film). A melt-extrusion process, a flow casting process or the like may be employed for the film formation. The flow casting process is preferred for the accuracy of the film thickness.

In the present disclosure, the flow casting process is performed, for example, in the following manner.

For the dissolution, an ordinary-temperature dissolving method, a higher-temperature dissolving method, a higher-pressure dissolving method or the like is employed. Particularly, the higher-temperature dissolving method and the higher-pressure dissolving method are preferred because the resin composition is less liable to be left undissolved and the productivity is higher.

In the higher-temperature dissolving method, the dissolving temperature is typically 80° C. to 100° C., preferably 90° C. to 100° C. In the higher-pressure dissolving method, the dissolving temperature is typically 80° C. to 130° C., preferably 90° C. to 120° C.

The dissolving period is typically 1 to 20 hours, preferably 2 to 15 hours, more preferably 3 to 10 hours. If the dissolving period is excessively short, the resin composition tends to be left undissolved. If the dissolving period is excessively long, productivity tends to be reduced.

In the dissolving step, a paddle, a full-zone stirring blade, a max-blend stirring blade, a twister, an anchor stirring blade, a ribbon, a propeller or the like is used as a stirring blade.

After the dissolving step, the resulting PVA resin aqueous solution is degassed. Exemplary degassing methods include a static degassing method, a vacuum degassing method and a twin-screw extrusion degassing method. Particularly, the static degassing method and the twin-screw extrusion degassing method are preferred.

The temperature for the static degassing method is typically 50° C. to 100° C., preferably 70° C. to 95° C., and the degassing period is typically 2 to 30 hours, preferably 5 to 20 hours.

In the flow casting process, for example, a PVA resin aqueous solution is prepared by adding water to the PVA resin (A) (in a powdery form), and then the plasticizer (B) and the other ingredients are added to the PVA resin aqueous solution. Thus, an aqueous dispersion or an aqueous solution of the PVA resin composition is prepared. Alternatively, water is added to the resin composition containing the PVA resin (A) and preferably further containing the plasticizer (B) and the other ingredients, whereby the aqueous dispersion or the aqueous solution of the PVA resin composition is prepared. The aqueous dispersion or the aqueous solution of the PVA resin composition preferably has a solid concentration of 10 to 50 wt. %, particularly preferably 15 to 40 wt. %, more preferably 20 to 35 wt. %. If the solid concentration is excessively low, the productivity of the water-soluble film tends to be reduced. If the solid concentration is excessively high, the aqueous dispersion or the aqueous solution (dope) has an excessively high viscosity, so that a longer time is required for the degassing of the dope and a die line is liable to occur in the formation of the water-soluble film. Further, where the temperature of an endless belt or a drum roll metal surface is excessively low, a longer time is required for drying the aqueous dispersion or the aqueous solution. Where the temperature of the endless belt or the drum roll metal surface is excessively high, the aqueous dispersion or the aqueous solution is liable to foam in the film formation.

The aqueous dispersion or the aqueous solution is passed through a slit such as of a T-die, then flow-cast on a cast surface (e.g., an endless belt, a drum roll metal surface, a surface of a plastic base such as a polyethylene terephthalate film, or the like) and dried and, as required, heat-treated. Thus, the inventive PVA film (water-soluble film) is formed.

For example, the following conditions are employed for the film formation.

The temperature of an outlet port through which the aqueous dispersion or the aqueous solution of the PVA resin composition is discharged is preferably 60° C. to 98° C., particularly preferably 70° C. to 95° C. If the temperature of the outlet port is excessively low, the drying period tends to be prolonged, thereby reducing the productivity. If the temperature of the outlet port is excessively high, the aqueous dispersion or the aqueous solution tends to suffer from foaming or the like.

In the film formation, the film-forming rate is preferably 3 to 80 m/minute, particularly preferably 5 to 60 m/minute, more preferably 8 to 50 m/minute.

In the present disclosure, it is important to properly heat-treat the PVA film, i.e., to heat-treat the PVA film at a relatively high temperature, to control the product (T×S) of the complete dissolution time (T) and the curl area percentage (S), which is a feature of the present disclosure.

A heat roll may be used for the heat treatment. Alternatively, a floating process or a far-infrared treatment may be performed. Particularly, the heat treatment is preferably performed with the use of the heat roll from the viewpoint of the productivity. The heat treatment temperature is preferably 95° C. to 135° C., more preferably 100° C. to 135° C., further preferably 105° C. to 130° C., particularly preferably 110° C. to 125° C., especially preferably 110° C. to 120° C. If the heat treatment temperature is excessively low, the curl-suppressing effect tends to be poorer. If the heat treatment temperature is excessively high, the water-soluble film tends to have lower solubility.

The heat treatment period is preferably 1 to 60 seconds, particularly preferably 3 to 50 seconds, more preferably 5 to 40 seconds. If the heat treatment period is excessively short, the curl-suppressing effect tends to be poorer. If the heat treatment period is excessively long, the water-soluble film is improved in curl-suppressing effect, but tends to have lower solubility.

Further, the PVA film (water-soluble film) may be formed by casting the aqueous dispersion or the aqueous solution of the PVA resin composition on a metal base or a plastic base such as a polyethylene terephthalate film or a polyethylene film with the use of an applicator, and then drying the cast aqueous dispersion or solution.

The thickness of the PVA film may be properly selected according to the use purpose, but is preferably 10 to 120 µm, more preferably 15 to 110 µm, particularly preferably 20 to 100 µm. If the thickness of the PVA film is excessively small, the PVA film tends to have a lower mechanical strength. If the thickness of the PVA film is excessively great, the water dissolution rate tends to be reduced, and the film-forming efficiency also tends to be reduced.

The width of the PVA film may be properly selected according to the use purpose, but is preferably 300 to 5000 mm, more preferably 500 to 4000 mm, particularly preferably 800 to 3000 mm. If the width of the PVA film is excessively small, the productivity tends to be reduced. If the width of the PVA film is excessively great, it will be difficult to control the slack of the film and the thickness of the film.

The length of the PVA film may be properly selected according to the use purpose, but is preferably 500 to 20000 m, more preferably 800 to 15000 m, particularly preferably 1000 to 10000 m. If the length of the PVA film is excessively small, troublesome film switching will be required. If the length of the PVA film is excessively great, the resulting film roll tends to have poorer appearance due to tight winding and an excessively great weight.

The PVA film may have plain surfaces, but one or both of the surfaces are preferably subjected to a texturing process as having an emboss pattern, a minute uneven pattern, a special engraved pattern or the like for antiblocking property, slidability during processing, appearance, and for suppression of adhesion between film products.

The temperature for the texturing process is typically 60° C. to 150° C., preferably 80° C. to 140° C., and the pressure for the texturing process is typically 2 to 8 MPa, preferably 3 to 7 MPa. The period for the texturing process depends on the texturing pressure and the film-forming rate, but is typically 0.01 to 5 seconds, preferably 0.1 to 3 seconds After the texturing process, as required, the PVA film (water-soluble film) may be subjected to a cooling process for prevention of unintended thermal stretching of the film.

In the present disclosure, the resulting PVA film (water-soluble film) preferably has a water content of 3 to 15 wt. %, particularly preferably 5 to 14 wt. %, more preferably 6 to 13 wt. %, for the mechanical strength and the sealability. If the water content is excessively low, the water-soluble film tends to be excessively hard. If the water content is excessively high, the water-soluble film tends to suffer from the blocking. The water content of the PVA film (water-soluble film) may be controlled by properly setting conditions for the drying and the moisture conditioning.

The water content is measured in conformity with JIS K6726 3.4. The resulting volatile content is defined as the water content.

In the present disclosure, the film is preferably formed, for example, at 10° C. to 35° C., particularly preferably 15° C. to 30° C. The humidity is typically not higher than 70% RH.

It is important that the product (T×S) of the complete dissolution time (T) and the curl area percentage (S) of the PVA film (water-soluble film) thus produced satisfies the above expression (1). The product (T×S) is controlled in the aforementioned range by the heat-treatment at a relatively high temperature as described above. Other exemplary methods for controlling the product (T×S) include: (1) a method in which the film is embossed; (2) a method in which two or more types of plasticizers are used in combination; and (3) combinational use of the methods (1) and (2).

In the present disclosure, the resulting PVA film is wound up around a core pipe (S1) into a film roll. The resulting film roll may be supplied as a product on an as-is basis. Preferably, the PVA film is wound up around a core pipe (S2) having a length corresponding to a desired film width, and then supplied in the form of a film roll.

The core pipe (S1) around which the film is wound up has a hollow cylindrical shape. The material for the core pipe (S1) may be properly selected from metals, plastics and the like, but is preferably a metal for robustness and strength.

The core pipe (S1) preferably has an inner diameter of 3 to 30 cm, more preferably 10 to 20 cm.

The core pipe (S1) preferably has a wall thickness of 1 to 30 mm, more preferably 2 to 25 mm.

The core pipe (S1) needs to have a length that is greater than the width of the PVA film, and opposite end portions of the core pipe (S1) preferably project by 1 to 50 cm from opposite ends of the film roll.

The core pipe (S2) has a hollow cylindrical shape. The material for the core pipe (S2) may be properly selected from paper, metals, plastics and the like, but is preferably paper for weight reduction and handling ease.

The core pipe (S2) preferably has an inner diameter of 3 to 30 cm, more preferably 10 to 20 cm.

The core pipe (S2) preferably has a wall thickness of 1 to 30 mm, more preferably 3 to 25 mm.

The core pipe (S2) may have a length that is equal to or greater than the width of the PVA film product, but is preferably greater than the PVA film width by 0 cm to 50 cm.

The PVA film is slit as having a desired width when being wound around the core pipe (S2).

For the slitting, a shear blade or a leather blade is used. The PVA film is preferably slit by means of the shear blade from the viewpoint of the smoothness of a sectional surface of the slit film.

In the present disclosure, the resulting film roll is wrapped with a wrapping film of a resin having a water vapor barrier property. The wrapping film is not particularly limited, but a wrapping film having a water vapor permeability of not greater than 10 g/m²·24 hr (as measured in conformity with JIS Z0208) is usable. Specific examples of the wrapping film include single-layer films such as a high-density polyethylene film, a low-density polyethylene film, a polypropylene film, a polyester film, a polyvinylidene chloride-coated polypropylene film and a glass-deposited polyester film, laminate films including any of these films, and laminate films including any of these films and a slit fabric, paper or a nonwoven fabric. Examples of the laminate films include a laminate film including a glass-deposited polyester film and a polyethylene film, and a laminate film including a polyvinylidene chloride-coated polypropylene film and a polyethylene film.

The wrapping film is preferably subjected to an antistatic process for prevention of contamination with foreign matter. The wrapping film may contain an antistatic agent incorporated therein by kneading, or may be coated with the antistatic agent. Where the antistatic agent is incorporated in the wrapping film by kneading, the antistatic agent is used in a proportion of about 0.01 to about 5 wt. % based on the weight of the resin. Where the wrapping film is coated with the antistatic agent, the antistatic agent is used in an amount of about 0.01 to about 1 g/m².

Examples of the antistatic agent include alkyl diethanolamines, polyoxyethylene alkylamines, higher fatty acid alkanolamides and sorbitan fatty acid esters.

The film roll wrapped with the wrapping film of the water vapor barrier resin is preferably further wrapped with a wrapping film of an aluminum material. Examples of the aluminum material film include an aluminum foil, a laminate film including an aluminum foil and a moisture-resistant plastic film (e.g., a laminate film including an aluminum foil and a polyethylene film), a laminate film including an aluminum-deposited film and a moisture-resistant plastic film (e.g., a laminate film including an aluminum-deposited polyester film and a polyethylene film), and a laminate film including an alumina-deposited film and a moisture-resistant plastic film (e.g., a laminate film including an alumina-deposited polyester film and a polyethylene film). In the present disclosure, a laminate film including an aluminum foil and a polyolefin film, and a laminate film including an aluminum-deposited film and a polyolefin film are particularly useful. A laminate film of a stretched polypropylene film/polyethylene film/aluminum foil/polyolefin film structure, and a laminate film of a stretched polypropylene film/low-density polyethylene film/aluminum foil structure are particularly useful.

The film roll is first wrapped with an inner wrapping film of the water vapor barrier resin and then with an outer wrapping film of the aluminum material, and widthwise margins of the wrapping films are squeezed into the core pipe.

In the present disclosure, protection pads each having a core pipe through-hole are respectively attached to opposite ends of the film roll directly or with the intervention of the wrapping film in order to prevent the ends of the film roll from being damaged or contaminated with dust or other foreign matter.

Practical examples of the protection pads include disk-shaped sheets and films conforming to the shape of the film roll. The protection pads are preferably made of a foam, a woven fabric or a nonwoven fabric so as to be imparted with a cushioning function for enhanced protection effect. Further, the protection pads may additionally contain a desiccant, or may be laminated with or blended with the desiccant so as to protect the film roll from moisture.

Plastics are useful as the material for the protection pads. Specific examples of the plastics include polystyrenes, polyethylenes, polypropylenes, polyesters and polyvinyl chlorides.

The desiccant-containing protection pads may be, for example, moisture absorbing layers each produced by allowing a formable material such as natural cellulose, synthetic cellulose, a glass cloth or a nonwoven fabric to contain a desiccant or a water absorbing agent such as calcium chloride, silica gel, molecular sieves, saccharide (particularly, saccharide having a higher osmotic pressure) or a water absorbing resin by a dispersing method, an impregnating method or a coating/drying method, or by sandwiching the desiccant or the water absorbing agent between layers of the formable material or between thermoplastic resin films such as polyester films, polyethylene films, polypropylene films or TEFLON (registered trade name) films.

Commercially available examples of a desiccant sheet include AIDY SHEET available from Aidy Co., Ltd., ARROW SHEET and ZEO SHEET available from Shinagawa Chemicals Co., Ltd., and HIGHSHEET DRY available from Highsheet Kogyo Co., Ltd.

The film roll wrapped in the aforementioned manner is preferably supported in the air without contact with the floor by providing brackets (support plates) to the projecting opposite end portions of the core pipe or by resting the projecting opposite end portions on trestles and, in this state, stored or transported. Where the film roll has a relatively small width, the brackets are used. Where the film roll has a relatively great width, the trestles are used.

The brackets are each made of a plywood or a plastic plate, and dimensioned so that four edges thereof each have a length greater than the diameter of the film roll.

The pair of brackets are disposed upright in opposed relation to the projecting opposite end portions of the core pipe of the film roll, and engaged with the film roll. For the engagement, the brackets each have a through-hole formed in a center portion thereof as having a diameter slightly greater than the core pipe diameter. Alternatively, the brackets may each have a generally U-shape with a through-hole extending from a top edge thereof to a center portion thereof for easy insertion of the core pipe.

The film roll supported by the brackets is contained in a carton such as a cardboard box and, in this state, stored and transported. Where rectangular brackets are to be used, the four corners of each of the brackets are preferably cut off for smooth handling of the film roll during the storage.

Further, it is effective to firmly fix the pair of brackets to each other by a binding tape. For practical prevention of displacement and slack of the tape, the brackets may each have a tape displacement preventing groove formed in a side face (thickness wise portion) thereof as having substantially the same width as the tape.

It is not desirable to store and transport the wrapped film roll at an excessively high temperature or an excessively low temperature or at an excessively low humidity or an excessively high humidity. Specifically, the wrapped film roll is preferably stored or transported at a temperature of 10° C. to 30° C. at a humidity of 40 to 75% RH.

The inventive water-soluble film thus produced is useful for various packaging applications. Particularly, the water-soluble film is useful for unit packaging applications for unit-packaging a chemical agent or the like. The chemical agent is not particularly limited, but may be alkaline, neutral or acidic. Further, the chemical agent may be in a granular form, a tablet form, a powdery form or a liquid form. The chemical agent is preferably dissolved or dispersed in water for use. The water-soluble film is particularly useful for packaging a liquid detergent.

The liquid detergent preferably has a pH of 6 to 12, particularly preferably 7 to 11 when being dissolved or dispersed in water. The liquid detergent preferably has a water content of not higher than 15 wt. %, particularly preferably 0.1 to 10 wt. %, more preferably 0.1 to 7 wt. %. Thus, the water-soluble film has satisfactory water solubility without gelation and insolubilization.

The pH is measured in conformity with JIS K3362 8.3, and the water content is measured in conformity with JIS K3362 7.21.3.

<Chemical Agent Package>

A liquid detergent package, which is an example of the inventive chemical agent package, includes a package bag formed from the water-soluble film, and a liquid detergent contained in the package bag. The liquid detergent package typically has a length of 10 to 50 mm, preferably 20 to 40 mm. The package bag formed from the water-soluble film typically has a film thickness of 10 to 120 μm, preferably 15 to 110 μm, more preferably 20 to 100 μm. The amount of the contained liquid detergent is typically 5 to 50 mL, preferably 10 to 40 mL.

The liquid detergent package has a flat surface. The outer surface of the package (water-soluble film) may be textured as having an emboss pattern, a minute uneven pattern, a special engraved pattern or the like for the antiblocking property, the slidability during processing and the appearance and for suppression of adhesion between products (packages). The liquid detergent package maintains its shape with the liquid detergent contained therein during the storage thereof. Then, when the liquid detergent package is used (for washing), the package bag (water-soluble film) is brought into contact with water, whereby the package bag is dissolved and the contained liquid detergent flows out of the package bag.

With the use of the inventive water-soluble film, the chemical agent package in which the liquid detergent is packaged is produced by a conventionally known method. Examples of the known method include: (1) a heat sealing method; (2) a water sealing method; and (3) an adhesive sealing method, among which the water sealing method (2) is useful and generally used.

EXAMPLES

The present disclosure will hereinafter be described more specifically by way of examples thereof. However, it should be understood that the present disclosure be not limited to these examples within the scope of the disclosure.

In the examples, "part(s)" and "%" are based on weight.

Example 1

A PVA aqueous solution (having a solid concentration of 25%) was prepared by mixing 90 parts of a carboxyl group-modified PVA (A1) (having a 4% aqueous solution viscosity of 22 mPa·s as measured at 20° C., an average saponification degree of 94 mol % and a monomethyl maleate modification degree of 2.0 mol %) and 10 parts of an unmodified PVA (A2) (having a 4% aqueous solution viscosity of 18 mPa·s as measured at 20° C. and an average saponification degree of 88 mol %) as a PVA resin (A), 20 parts of sorbitol (b1) and 20 parts of glycerin (b2) as a plasticizer (B), 8 parts of starch (having an average particle diameter of 20 μm) as a filler (C), 2 parts of a polyoxyalkylene alkyl ether phosphate monoethanolamine salt as a surfactant (D) and water for dispersing the starch and dissolving the other ingredients in water.

The resulting PVA aqueous solution was degassed at 80° C., and then cooled to 40° C. The PVA aqueous solution was flow-cast on a polyethylene terephthalate film (having a thickness of 125 μm and a width of 300 mm) to a thickness of 630 μm and a width of 200 mm. Then, the film was passed through a 3-m long drying chamber (at 105° C.) at a speed of 0.350 m/minute to be thereby dried. Thus, a PVA film (water-soluble film) having a thickness of 89 μm was formed.

The PVA film (F0) (water-soluble film) thus formed was attached to a 300 mm×210 mm stainless steel frame with its four edges fixed to the frame, and heat-treated in a hot air dryer set at 100° C. for 30 seconds. Thus, a PVA film (F1) (water-soluble film) was produced.

Measurement and evaluation were performed on the PVA film (F1) (water-soluble film) thus produced.

[Complete Dissolution Time (T)]

A 35 mm×35 mm water-soluble film specimen was cut out from a middle portion of the water-soluble film with respect to a transverse direction (TD). The water-soluble film specimen was allowed to stand at 23° C. at 40% RH for 24 hours, and then fastened to a jig so as to be kept parallel to a water surface. On the other hand, 1 liter of water at 10° C. was put in a 1-liter beaker, and stirred so that a vortex was formed to reach a height of 50 mm from the water surface by controlling the rotation of a stirrer (having a rotor length of 3 cm and a rotation speed of 750 rpm). The water-soluble film specimen preliminarily fastened to the jig was placed at a depth of 50 mm below the water surface, and then a time (seconds) required for dissolving the water-soluble film specimen was measured.

[Curl Area Percentage (S)]

A 100 mm×100 mm water-soluble film specimen was cut out from a middle portion of the water-soluble film with respect to the transverse direction (TD). Then, as shown in FIG. 1, a machine direction (MD) edge of the water-soluble film specimen 1 was fixed by a 15-mm wide adhesive tape 2, and the water-soluble film specimen 1 was kept suspended at 23° C. at 40% RH for 24 hours. At this time, the area of a curled portion of the water-soluble film specimen 1 was calculated. Based on the value of the area thus calculated, the curl area percentage (S) of the water-soluble film specimen 1 was calculated from the following expression:

$$\text{Curl area percentage (\%)} = 100 \times [\{(X1)+(X2)\}/2] \times 100/10000$$

X1: The length (mm) of a first curl edge as measured from the lowermost end of the uncurled specimen to a center of the first curl edge.

X2: The length (mm) of a second curl edge as measured from the lowermost end of the uncurled specimen to a center of the second curl edge.

Example 2

A PVA film (F0) (water-soluble film) was formed in the same manner as in Example 1.

The EVA film (F0) (water-soluble film) thus formed was attached to a 300 mm×210 mm stainless steel frame with its four edges fixed to the frame, and heat-treated in a hot air dryer set at 110° C. for 30 seconds. Thus, a PVA film (F2) (water-soluble film) was produced.

Measurement and evaluation were performed on the thus produced PVA film (F2) (water-soluble film) in the same manner as in Example 1.

Example 3

A PVA film (F0) (water-soluble film) was formed in the same manner as in Example 1.

The PVA film (F0) (water-soluble film) thus formed was attached to a 300 mm×210 mm stainless steel frame with its four edges fixed to the frame, and heat-treated in a hot air dryer set at 120° C. for 30 seconds. Thus, a PVA film (F3) was produced.

Measurement and evaluation were performed on the thus produced PVA film (F3) (water-soluble film) in the same manner as in Example 1.

Example 4

A PVA film (F0) (water-soluble film) was formed in the same manner as in Example 1.

The PVA film (F0) (water-soluble film) thus formed was attached to a 300 mm×210 mm stainless steel frame with its four edges fixed to the frame, and heat-treated in a hot air dryer set at 130° C. for 30 seconds. Thus, a PVA film (F4) was produced.

Measurement and evaluation were performed on the thus produced PVA film (F4) (water-soluble film) in the same manner as in Example 1.

Example 5

A PVA film (F0) (water-soluble film) was formed in the same manner as in Example 1.

The PVA film (F0) (water-soluble film) thus formed was attached to a 300 mm×210 mm stainless steel frame with its four edges fixed to the frame, and heat-treated in a hot air dryer set at 95° C. for 30 seconds. Thus, a PVA film (F5) was produced.

Measurement and evaluation were performed on the thus produced PVA film (F5) (water-soluble film) in the same manner as in Example 1.

Comparative Example 1

A PVA film (F0) (water-soluble film) was formed in the same manner as in Example 1.

The PVA film (F0) (water-soluble film) thus formed was attached to a 300 mm×210 mm stainless steel frame with its four edges fixed to the frame, and heat-treated in a hot air dryer set at 90° C. for 30 seconds. Thus, a PVA film (F6) (water-soluble film) was produced.

Measurement and evaluation were performed on the thus produced PVA film (F6) (water-soluble film) in the same manner as in Example 1.

Comparative Example 2

A PVA film (F0) (water-soluble film) was formed in the same manner as in Example 1.

The PVA film (F0) (water-soluble film) thus formed was attached to a 300 mm×210 mm stainless steel frame with its four edges fixed to the frame, and heat-treated in a hot air dryer set at 140° C. for 30 seconds. Thus, a PVA film (F7) (water-soluble film) was produced.

Measurement and evaluation were performed on the thus produced PVA film (F7) (water-soluble film) in the same manner as in Example 1.

The evaluation results for Examples and Comparative Examples are shown in Table 1.

TABLE 1

| | Heat treatment temperature (° C.) | Complete dissolution time T (sec) at 10° C. | Curl area percentage S (%) | T × S |
|---|---|---|---|---|
| Example 1 | 100 | 115 | 40 | 4600 |
| Example 2 | 110 | 112 | 35 | 3920 |
| Example 3 | 120 | 135 | 27 | 3645 |
| Example 4 | 130 | 137 | 15 | 2055 |
| Example 5 | 95 | 111 | 49 | 5439 |
| Comparative Example 1 | 90 | 105 | 85 | 8925 |
| Comparative Example 2 | 140 | 166 | 5 | 830 |

In Examples, the relationship between the complete dissolution time and the curl area percentage is optimized, so that the product (T×S) of the complete dissolution time and the curl area percentage falls within the predetermined range. Therefore, the water-soluble films of Examples are highly soluble and are less susceptible to curling to thereby ensure excellent sealability without the displacement thereof and higher productivity when packages are produced from the water-soluble films. In Comparative Examples, in contrast, the complete dissolution time and the curl area percentage are unbalanced, so that the product (T×S) of the complete dissolution time and the curl area percentage falls outside the predetermined range. Therefore, when packages are produced from the water-soluble films of Comparative Examples, the productivity is unsatisfactory. The results indicate that an excellent package can be produced, for example, by packaging a liquid detergent with any of the water-soluble films of Examples.

<Production of Liquid Detergent Package>

With the use of the PVA film (F1) produced in Example 1, a package was produced in the following manner by means of a package producing apparatus available from Engel Corporation.

More specifically, a bottom film of the PVA film (F1) was fixed onto a mold (for a package having a length of 45 mm, a width of 42 mm and a height of 30 mm) disposed in a lower portion of the apparatus, and a top film of the PVA film (F1) was fixed to an upper portion of the apparatus. The bottom film was heated for 10 seconds by a dryer capable of blowing hot air at 90° C., and vacuum-formed in the mold. Thereafter, 20 mL of P&G's liquid detergent ARIEL POWER Gel BALL (containing 5.4% of glycerin, 22.6% of propylene glycol and 10.4% of water, and having a polyalcohol content of 28%) was put on the formed bottom film of the PVA film (F1). Then, 1.5 g of water was applied to the top film, which was in turn pressed against the bottom film. The top film and the bottom film were press-sealed for 30 seconds, and then released from vacuum. Thus, the package was produced.

The liquid detergent package thus produced was excellent in appearance and the like.

While specific forms of the embodiment of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The inventive water-soluble film is highly soluble, and is less susceptible to curling to thereby ensure excellent sealability without the displacement thereof and higher productivity when a package is produced from the water-soluble film. The inventive water-soluble film is usable for various packaging applications, and particularly useful for chemical agent unit-packaging applications, particularly, for liquid detergent unit-packaging applications.

The invention claimed is:

1. A water-soluble film comprising a polyvinyl alcohol resin (A), and having a complete dissolution time (T) and a curl area percentage (S), wherein a product (T×S) of the complete dissolution time (T) and the curl area percentage (S) satisfies the following expression (1):

$$1000 \leq (\text{Complete dissolution time }(T)) \times (\text{Curl area percentage }(S)) \leq 7000 \tag{1}$$

wherein the complete dissolution time (T) is a time (seconds) required for dissolving a 35 mm×35 mm specimen of the water-soluble film in water as measured when the specimen is immersed in water at 10° C. after being allowed to stand at 23° C. at 40% RH for 24 hours, and the curl area percentage (S) is a percentage (%) of an area of a curled portion of a 100 mm×100 mm specimen of the water-soluble film with respect to an area of the entire specimen as measured from its front side after the specimen is suspended at 23° C. at 40% RH for 24 hours with a machine direction (MD) edge of the specimen fixed;

wherein the polyvinyl alcohol resin (A) comprises a carboxyl-group-modified PVA resin;

wherein the water-soluble film further comprises a plasticizer (B) in a proportion of not less than 35 parts by weight based on 100 parts by weight of the PVA resin (A);

and wherein the water-soluble film is prepared by forming a film from a film-forming material containing the PVA resin (A), drying the film, and heat-treating the film at 95 to 135° C.

2. The water-soluble film according to claim 1, wherein the complete dissolution time (T) is not longer than 150 seconds.

3. The water-soluble film according to claim 1, wherein the curl area percentage (S) is not higher than 50%.

4. The water-soluble film according to claim 1, wherein plasticizer (B) comprises plasticizer (b1) and plasticizer (b2), wherein the plasticizer (b1) is a polyalcohol having a melting point not lower than 80° C., and the plasticizer (b2) is a polyalcohol having a melting point not higher than 50° C.

5. The water-soluble film according to claim 4, wherein the plasticizer (b1) is selected from the group consisting of salicyl alcohol, catechol, resorcinol, hydroquinone, bisphenol-A, bisphenol-F, neopentyl glycol, phloroglucinol, erythritol, threitol, pentaerythritol, xylitol, arabitol, fucitol, glucose, fructose, mannitol, sorbitol, inositol, lactitol, sucrose, maltitol, trehalose, and combinations thereof; and
   wherein the plasticizer (b2) is selected from the group consisting of ethylene glycol, diethylene glycol, triethylene glycol, propylene glycol, tetraethylene glycol, 1,3-propanediol, 1,4-butanediol, 1,6-hexanediol, tripropylene glycol, polyethylene glycol having a molecular weight of not greater than 2,000, glycerin, diglycerin, triethanolamine, and combinations thereof.

6. The water-soluble film according to claim 4, wherein the plasticizer (B) is present in a proportion of [not less than 20] 35 to 70 parts by weight based on 100 parts by weight of the polyvinyl alcohol resin (A).

7. The water-soluble film according to claim 1, wherein the water-soluble film has a water content of 3 to 15 wt. % as a whole.

8. The water-soluble film according to claim 1, wherein the water-soluble film is usable for a chemical agent package.

9. A chemical agent package comprising:
   a package bag formed from the water-soluble film according to claim 1; and
   a liquid detergent packaged in the package bag.

10. The chemical agent package according to claim 9,
   wherein the liquid detergent has a pH of 6 to 12 when dissolved or dispersed in water,
   wherein the liquid detergent has a water content of not higher than 15 wt. %.

* * * * *